United States Patent Office 3,074,806
Patented Jan. 22, 1963

3,074,806
DOLOMITIC REFRACTORY
Leon M. Atlas, Melrose Park, and Donald C. Schell, Berwyn, Ill., assignors, by mesne assignments, to Basic Incorporated, Cleveland, Ohio, a corporation of Ohio
No Drawing. Filed Dec. 18, 1959, Ser. No. 860,364
13 Claims. (Cl. 106—58)

This invention relates to an improved dolomitic refractory, composed essentially of dead-burned magnesium oxide and calcium oxide, prepared by high-temperature calcination and sintering of dolomitic limestone. Such dolomitic refractory, known in the art as "dead-burned dolomite," is used in large quantities in the steel industry for the repair of the hearth linings of basic electric and open-hearth furnaces. This refractory is also employed in the form of brick as for the inner working lining of an oxygen steel converter used in the recently developed process in which oxygen is substituted for air in the Thomas conversion process.

The present commercial process used in North America for producing dead-burned dolomite comprises:

(1) Crushing and screening high purity dolomite limestone rock to yield suitably sized granules, e.g., of a size to pass through a 0.5" square opening screen and to be retained on a 0.1" square opening screen;

(2) Mixing the sized granules with commercial iron oxide (equivalent to 4-8% $Fe_2O_3$ in the final sintered product); and then (3) Calcining and sintering the mixture in a rotary kiln at temperatures of about 2900-3200° F. to produce hard dense sintered granules.

The iron oxide aids in the sintering to yield a dense, black granule having a bulk density of 3.1-3.2 grams per cubic centimeter. These granules are essentially composed of crystalline calcium oxide and magnesium oxide, the latter being the so-called periclase. The iron oxide appears to be particularly well suited for this product, since in the ferric form as developed in the rotary kiln it reacts with the calcium oxide to form calcium ferrites and with the magnesium oxide to form refractory solid solutions of magnesioferrite in periclase. The calcium ferrites, having relatively low melting temperatures, markedly improved the sinterability of the product when subjected to the high temperatures of the steel-making furnace. However, when these ferric compounds come in contact with the metallic iron charged into the furnace, they are essentially reduced to the ferrous state. For the most part, the resulting FeO from both the magnesioferrite and the calcium ferrites enter into solid solution in the periclase which remains quite refractory even when containing large amounts of FeO.

In the repair of either the open-hearth or electric furnace, it is necessary that the repair material sinter into a dense monolithic mass when subjected to the heat of the furnace. As dead-burned dolomite forms such a dense mass more rapidly and adequately than either raw dolomite stone or quicklime, i.e., light-burned dolomite, the dead-burned product is the preferred repair material, especially within the United States. As is evidenced from the above requisite, it is necessary that the dead-burned dolomite granules be initially well sintered to a dense mass of low porosity. In the past, the sintering processes, used to produce such granules, have been aided by the addition of various so-called "dead-burning agents" or fluxes such as the aforementioned iron oxide. Other materials also used have been clays, alumina, silica, and mixtures thereof with iron oxide. However, unlike iron oxide which forms refractory solid solutions with periclase when in the form of ferrous oxide (as mentioned above), these oxides with calcium form compounds which are permanently liquid at steel-making temperatures. This liquid either remains in the lining with a consequent softening action or migrates through the molten iron bath and finally into the slag. For this reason and the further reason that relatively high percentages were previously thought necessary, as hereinafter described, the practice of adding clays, alumina, silica, and the like as fluxes or dead-burning agents has fallen into disuse.

In Europe and Great Britain, most of the burned dolomite for refractory use is produced in vertical shaft kilns or cupolas. Usually, the dolomite rock fed to the kiln inherently contains greater concentrations of impurities than the rock used in the United States. The pieces of stone fed to the kiln may vary from about two inches to four inches in maximum dimension. These pieces are charged to the kiln with alternate layers of coke as the fuel. The maximum temperatures attained in the kiln are of the order of about 3100° F.–3600° F. The product is sintered to a hard mass of about half the volume of the original stone. This effect is accomplished not only by the high temperatures but also by the fluxing action of the impurities in the stone and the silica, iron oxide, and alumina introduced by the coke ash. Consequently, the sintered product, "basic" or "doloma" as it is called in Great Britain, contains considerable amounts of fluxing agents as evidenced by a typical range of compositions given by J. H. Chesters in "Steelplant Refractories," Sheffield, second edition, 1957:

| | Percent |
|---|---|
| $SiO_2$ | 2.7–3.5 |
| $Fe_2O_3$ | 1.7–2.5 |
| $Al_2O_3$ | 1.6–2.4 |
| CaO | 53–59 |
| MgO | 35–38 |

It is to be noted that the total fluxing impurities or dead-burning agents may vary between 6.0 and 8.4%. One manufacturer produces in a special rotary kiln a product with the following range of flux components:

| | Percent |
|---|---|
| $SiO_2$ | 0.9–2.2 |
| $Fe_2O_3$ | 0.4–2.0 |
| $Al_2O_3$ | 0.4–1.7 | with a total flux content ranging between 2.0 and 5.0%.

Despite the high temperatures and large amounts of fluxing agents, the typical bulk density of the foregoing products is only 2.70 grams per cubic centimeter, with a usual range of 2.64 to 2.78 grams per cubic centimeter. This is markedly lower than the densities found in the North American product.

In the initial years of the production of dead-burned dolomite, the raw rock was mixed with the burning agent and the two ingredients finely ground before introduction into the rotary kiln. In one variation of the process (U.S. Patent 1,063,103), the dolomite rock was first converted to quicklime in a shaft kiln, then crushed into granules of ⅝"–¾" maximum dimension and finally subjected to a second firing at high temperature in a rotary kiln thereby yielding the so-called "double-burned dolomite." However, unless the original dolomite rock contained an appreciable amount of impurities such as $SiO_2$, $Al_2O_3$, or $Fe_2O_3$, it was difficult to obtain a product of sufficient density. Therefore, it has always been a prime requisite for dead-burned dolomite to contain at least 4% or more of some dead-burning agent if a clinker of satisfactorily high density is to be obtained. However, even 4% of such fluxing agents have been found to be excessive and restricting the final use of the refractory, particularly when the product must withstand the very high temperatures of the electric arc steel furnace or of the oxygen converter.

With the need for a better dolomitic refractory in mind, we have discovered a new process for the production of dead-burned dolomite whereby a very dense product is obtained with the use of only about 0.3% to about 2.0% of a dead-burning agent.

It is, therefore, a principal object of the present invention to provide an improved dolomitic refractory and a method for producing it.

Another object is to provide a dolomitic refractory of high density and particularly one in which a relatively small amount of a flux or dead-burning agent is used.

A further object is to provide dolomitic refractory by forming a briquette of ground quick lime or calcined dolomite and a relatively small amount of a dead-burning agent, and then firing the briquette to yield a dense sintered mass.

A still further object is to provide a dead-burned dolomitic refractory having a density of about 3 grams per cubic centimeter or higher.

A still further object is to provide a process and resulting product in which fluxes or dead-burning agents such as clays, alumina, iron oxide, and silica can be successfully used and in relatively low percentages.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

In one form, the present invention embodies:

(1) Calcining dolomite rock to yield quicklime as an intimate mixture of CaO and MgO.

(2) Grinding the quicklime into a fine powder and mixing it with about 0.3% to about 2.0% by weight of a flux or dead-burning agent.

(3) Pressing the intimate blend of quicklime and dead-burning agent into compact, coherent briquettes.

(4) Firing the briquettes at an elevated temperature to yield a dense sintered mass.

The sintered product of low flux content from this improved process has densities of 3.1–3.2 grams per cubic centimeter which is quite comparable to the usual range of 3.1–3.2 grams per cubic centimeter for present-day commercial dead-burned dolomites prepared with iron oxide additions, and to 3.2 grams per cubic centimeter obtained in electrically fused dolomite.

The dolomite rock for the process may be taken from any natural deposit which yields a material of high purity. A rock containing up to 2% of any of the dead-burning agents hereinafter mentioned would be suitable, but a rock with only a fraction of a percent of impurities is more satisfactory as it avoids the variations in the impurity content prevailing in most natural deposits. A particularly suitable source is the Niagaran dolomite limestone of northwestern Ohio.

The dead-burning agents may be selected from many suitable sources, for example, diatomaceous earth, silica, opaline silica, silica gel, tripoli, iron oxide in the form of iron ore, mill scale, pyrite cinder, aluminum oxide and its hydrated compounds such as diaspore, gibbsite, bauxite, etc., various clays such as ball clay, flint, bentonite, and kaolin clay, and the like. The amorphous and/or hydrated forms of silica and of alumina have been found to be preferable to the anhydrous and crystalline varieties of these two oxides. This is apparently because the former are in a more chemically active, almost nascent-like state, at the higher temperatures employed during the sintering operation.

It is emphasized that in accordance with the present invention, flux or additives are used which have fallen generally into disrepute as previously noted, such as alumina, silica, and various compounds and mixes thereof. These additives should be essentially dry so that there is negligible hydration of the quick lime due to admixed water. The additives become effective in the subsequent sintering process to some degree with even a 0.3% addition, but the best results are obtained with amounts of about 1 to 2% contained in the final product.

The dolomite may be first calcined in any suitable and economical type of kiln such as the shaft kiln or the rotary kiln. The size of stone fed to the kiln may be that found most suitable for the particular piece of apparatus. Also, the fuel used may be that considered most suitable for an economical operation, as long as its use does not introduce excessive amounts of impurities into the quicklime. The resulting quicklime should be well calcined with a residual ignition loss of 10% or less, with 5% or less being preferred.

The quicklime and the dead-burning agents may be conveniently ground and mixed in a single suitable grinding mill which will reduce the material to a particle size essentially passing through a 50 mesh U.S. Standard sieve and preferably finer. In some instances, with hard additives, it may be convenient to pregrind this additive in a separate mill and then blend it with the feed to the final quicklime grinding mill. We have found that a ball or tube-type mill charged with steel balls is a most suitable and efficient unit for the grinding and intimate blending of the dry mixture.

A finely ground mixture of dolomite quicklime and dead-burning agent is pressed into pellets or briquettes using any suitable type of press which will yield a strongly coherent dense briquette. This press can be either hydraulically or mechanically actuated. For large scale operations, a double-roll briquetting press is quite suitable. Pressing pressures of only 4500 lbs. per square inch have been found satisfactory, but higher pressures are generally preferred so as to obtain strong briquettes with better resistance to the abrasion incurred during conveying and feeding to the kiln. The size and shape of the briquettes are not critical except that one dimension preferably should not exceed 0.75″. If it is desired, larger briquettes may be pressed and then crushed to pass through a 0.75″ opening screen.

During the processing steps of grinding, mixing, and pressing of the quicklime or calcined dolomite mixture, the materials should not be held in open storage for more than a few hours where they would otherwise be prone to absorb large amounts of moisture. Neither should the pressed briquettes be held in open storage for more than a day as they also absorb moisture with consequent disruptive expansion.

The briquettes are reburned in any suitable kiln having an inner refractory lining capable of withstanding the desired high temperatures. The firing may be carried out batchwise in a periodic kiln, but for economical large-scale commercial operation, a rotary kiln is preferred. The fuel used for firing the kiln may be natural gas, fuel oil, powdered coal, or any other fuel which would yield temperatures within the desired range of about 2800° F. to about 3200° F. The higher temperatures are considered more desirable as the sintering of the briquettes to a dense mass is thereby accomplished more rapidly and efficiently.

It has been found that a 30 minute exposure of the briquettes to the maximum temperature gives a satisfactory density in the final clinker. It is to be understood, however, that in any such burning process, the attainment of this maximum temperature may require a longer period of time. In some of the test firings, the time to increase the temperature of the material from about 2800° F. to about 3000° F. has been approximately 3½ to 4 hours. Thus, the period during which the material is fired or sintered may be extended if it be desired to fire the material at slightly reduced temperatures.

While we do not limit the invention by any theory, it is postulated that one reason a high density product is obtained, even though generally unfavorable dead-burning agents are used and in a lower amount than heretofore contemplated, is that the described process including mixing, pressure-briquetting, etc., achieves such an intimate, thorough and uniform mixture, that only a relatively slight fluxing action realizes the desired result. Although the fluxing action is slight per unit volume, such action takes place uniformly throughout the mass of the briquette as compared to a greater, stronger fluxing action which is substantially localized. Moreover, the thorough mixing and intimate contacting of the ingredients provided short paths of migration which such ingredients take while substantially fluid at the elevated firing temperatures to produce the ultimate sintered product.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

Example I

A dolomite rock of high purity was calcined at 2300 to 2500° F. in a commercial shaft kiln fired with producer gas. The resulting quicklime was then batch ball-milled for two hours with varying additions of kaolin or hydrated alumina ($Al_2O_3 \cdot 3H_2O$) or of diatomaceous earth. Portions of these individually-ground and blended batches were formed into pellets by pressing at 5000 lbs. per square inch. Specimens of each of the various types of pellets were then fired at temperatures of 2900, 3000, and 3100° F. In attaining these top temperatures, the gas fired kiln was above 2800° F. for approximately 4 hours. The kiln was held at the maximum temperatures mentioned above for a period of ½ hour. The bulk densities of the sintered pellets obtained with differing amounts of additives and at varying maximum firing temperatures are shown in the following table:

| Addition | Percent | Bulk Density, g./cm.³ | | |
|---|---|---|---|---|
| | | 2,900° F. | 3,000° F. | 3,100° F. |
| None | | 2.27 | 2.41 | 2.51 |
| $Al_2O_3 \cdot 3H_2O$ | 0.3 | 3.01 | 3.1 | 3.15 |
| $Al_2O_3 \cdot 3H_2O$ | 0.5 | 3.12 | 3.16 | 3.16 |
| $Al_2O_3 \cdot 3H_2O$ | 0.9 | 3.16 | 3.15 | 3.17 |
| Kaolin | 0.3 | 2.9 | 3.03 | 3.08 |
| Do | 0.6 | 3.10 | 3.10 | 3.18 |
| Do | 0.9 | 3.14 | 3.14 | 3.18 |
| Do | 1.2 | 3.19 | 3.16 | 3.20 |
| Do | 1.5 | 3.19 | 3.19 | 3.20 |
| Diatomaceous Earth | 1 | | 2.89 | |
| Do | 2 | | 3.14 | |

Example II

Niagaran dolomite rock of high purity was calcined at about 2200° F. to about 2600° F. in a commercial shaft kiln fired through an appendant fire box with high-volatile coal. The quicklime obtained therefrom was ground in a Raymond Automatic Pulverizer so that 73% of the particles passed through a 200 mesh U.S. standard sieve. The pulverized quicklime was then thoroughly blended in a horizontal multipaddle mixer with 1.5% Georgia kaolin. The blend was pressed by means of a high-pressure Komarek-Greaves double-roll press into pillow-shaped briquettes of 1.5" x 1.5" x 0.75" dimensions. The briquettes were then passed through a rotary kiln fired with light fuel oil. The sintered product prior to discharge attained a temperature of 3000° F. The approximate retention period at this temperature was about four hours. The sintered product was in the form of hard, dense briquettes having a bulk density of 3.18 grams per cubic centimeter. The concentrations of dead-burning agents in the sintered product were as follows:

| | Percent |
|---|---|
| $SiO_2$ | 1.08 |
| $Fe_2O_3$ | 0.26 |
| $Al_2O_3$ | 0.66 |

Example III

A sample of dolomitic quicklime from commercial shaft kiln production was ground in a porcelain jar mill to essentially pass a 200 mesh U.S. Standard sieve. A portion of pyrite cinder consisting essentially of $Fe_2O_3$ was similarly preground. Six hundred and eighty grams of the ground quicklime and 10.4 grams of the ground pyrite cinder were mixed in a pebble mill for thirty minutes. These proportions were selected to give a sintered product containing approximately 1.5% $Fe_2O_3$. The mixture was pressed in a hydraulic press at 26,000 p.s.i. to yield pellets of 0.56" diameter and 0.5" height. The pellets were then fired in an oil-fired periodic kiln with 12 hours being required to attain a temperature of 3,000° F. which was maintained for 4.3 hours. The sintered pellets, after cooling, had a density of 2.985 grams per cubic centimeter.

It will now be apparent that we have provided an improved dolomitic refractory and method of manufacture. Our dead-burned dolomite, preferably obtained in the form of briquettes, has a relatively high density of at least 3 grams per cubic centimeter. In achieving our product, we employ dead-burning agents or fluxes which have generally fallen into disuse because appreciably large quantities thereof were thought necessary. In contrast we employ such dead-burning agents in relatively small amounts ranging from 0.3 to 2% by weight.

Other forms embodying the features of the invention may be employed, change being made as regards the features herein disclosed, provided those stated by any of the following claims or the equivalent of such features be employed.

We therefore particularly point out and distinctly claim as our invention:

1. A process for producing an improved dolomitic refractory comprising heating dolomitic ore of high purity at a calcining temperature to form dolomitic quicklime, grinding and mixing the quicklime with a dead-burning agent to constitute in total amount present about 0.3 percent to about 2 percent by weight of such agent, briquetting the mixture, and then firing a briquette to a sintered state at a dead-burning temperature above such calcining temperature.

2. A process for producing an improved dolomitic refractory having a high density comprising heating dolomitic ore of high purity at a calcining temperature below about 2600° F. to form dolomitic quicklime, grinding the quicklime and mixing it with a dead-burning agent to constitute in total amount present about 0.3 percent to about 2 percent by weight of such agent, forming an article from the mixture, and then firing the formed article at a dead-burning temperature above about 2600° F. to produce a sintered dolomite having a density of at least 3 grams per cubic centimeter.

3. A process for producing an improved dolomitic refractory having a high density comprising heating ore containing at least 98 percent by weight dolomite below about 2600° F. for a sufficient time to remove only fugacious material to form quicklime, grinding the quicklime and intimately and thoroughly mixing therewith a dead-burning agent to constitute in total amount present only about 0.3 percent to about 2 percent by weight of such agent, briquetting the mixture, and then firing the briquettes at a temperature within the range of about 2800° F. to about 3200° F. for a sufficient time to produce a sintered dead-burned dolomite having a density of at least 3 grams per cubic centimeter.

4. A process for producing an improved dolomitic refractory having a high density comprising calcining a substantially pure dolomitic ore to form a quicklime having a residual ignition loss of not more than 10 percent, grinding the calcined dolomite to a particulate form, intimately and thoroughly mixing the ground calcined dolomite with a dead-burning agent to constitute in total amount present about 0.3 percent to about 2 percent by weight of such agent, briquetting the mixture, and then firing the briquettes at a temperature within the range of about 2800° F. to about 3200° F. for a sufficient time to produce a sintered dead-burned dolomite having a density of at least 2 grams per cubic centimeter.

5. The process of claim 4 wherein such dead-burning agent is a clay.

6. The process of claim 4 wherein such dead-burning agent is selected from the group consisting of diatomaceous earth, opaline silica, silica gel, tripoli, diaspore, gibbsite, bauxite, ball clay, flint clay, bentonite, and kaolin clay.

7. The process of claim 4 wherein such dead-burning agent is silica.

8. The process of claim 4 wherein such dead-burning agent is aluminum oxide.

9. A process for producing an improved dolomitic refractory having a high density comprising calcining a dolomitic ore containing at least about 98 percent by weight of dolomite to form a quicklime having a residual ignition loss of not more than 10 percent, grinding the calcined dolomite to a size sufficient to pass through at least a 50 mesh U.S. Standard sieve, intimately and thoroughly mixing the ground calcined dolomite with a dead-burning agent to constitute in total amount present about 0.3 percent to about 2 percent by weight of such agent, briquetting the mixture at relatively high pressure to aid in realizing such high density, and then firing the briquettes at a temperature within the range of about 2800° F. to about 3200° F. for a sufficient time to produce a sintered dead-burned dolomite having a density of at least 3 grams per cubic centimeter.

10. A process for producing an improved dolomitic refractory having a high density comprising calcining a dolomitic ore containing at least 98 percent by weight of dolomite to form a quicklime having a residual ignition loss of not more than 10 percent, grinding the calcined dolomite to a size sufficient to pass through at least a 50 mesh U.S. Standard sieve, intimately and thoroughly mixing the calcined dolomite with a dead-burning agent to constitute in total amount present only about 0.3 percent to about 2 percent by weight of such agent, briquetting the mixture at a pressure of at least 4500 p.s.i., and then firing the briquettes at a temperature within the range of about 2800° F. to about 3200° F. for about 0.5 to about 4 hours to produce a sintered dead-burned dolomite having a density of at least 3 grams per cubic centimeter.

11. A process for producing an improved dolomitic refractory comprising heating dolomitic ore of high purity at a calcining temperature to form dolomitic quicklime, grinding and mixing the quicklime with a dead-burning agent to constitute in total amount present about 0.3 percent to about 2 percent by weight of such agent, forming an article from the mixture, and then firing the formed article to a sintered state at a dead-burning temperature above such calcining temperature.

12. A refractory article produced in accordance with claim 2.

13. A process for producing an improved dolomitic refractory having a high density comprising calcining dolomite ore to form a quicklime having a residual ignition loss of not more than 10 percent, such ore being of sufficient purity to contain no more than two percent by weight on a calcined basis of impurities adapted to act as a dead-burning agent, grinding the calcined dolomite to a particulate form, mixing with the ground calcined dolomite a sufficient additive amount of a dead-burning agent to constitute in total amount present about 0.3 percent to about 2 percent by weight of such impurities and such agent combined, briquetting the mixture at a pressure of at least 4500 p.s.i., and then firing the briquettes at a temperature within the range of about 2800° F. to about 3200° F. for about 0.5 to about 4 hours to produce a sintered dead-burned dolomite having a density of at least 3 grams per cubic centimeter, such grinding, mixing, and briquetting steps being carried out within a sufficiently short time to prevent an absorption of moisture capable of producing a disruptive expansion in the briquettes.

References Cited in the file of this patent

UNITED STATES PATENTS

| | | |
|---|---|---|
| 1,994,377 | Williams et al. | Mar. 12, 1935 |
| 2,063,543 | Erdmann | Dec. 8, 1936 |
| 2,567,077 | Moon | Sept. 4, 1951 |

FOREIGN PATENTS

| | | |
|---|---|---|
| 153,177 | Australia | Sept. 11, 1953 |